US011916655B2

(12) United States Patent
Menzel et al.

(10) Patent No.: US 11,916,655 B2
(45) Date of Patent: Feb. 27, 2024

(54) TRANSMITTER AND/OR RECEIVER FOR TRANSMITTING AND/OR RECEIVING RADIO INFORMATION SIGNALS

(71) Applicant: INSTITUT FÜR RUNDFUNKTECHNIK, Munich (DE)

(72) Inventors: Christian Menzel, Maisach (DE); Javier Morgade Prieto, Munich (DE); Jordi Joan Gimenez Gandia, Munich (DE)

(73) Assignee: INSTITUT FÜR RUNDFUNKTECHNIK, Munich (DE)

( * ) Notice: Subject to any disclaimer, the term of this patent is extended or adjusted under 35 U.S.C. 154(b) by 76 days.

(21) Appl. No.: 16/961,430

(22) PCT Filed: Nov. 23, 2018

(86) PCT No.: PCT/EP2018/082421
§ 371 (c)(1),
(2) Date: Sep. 30, 2020

(87) PCT Pub. No.: WO2019/137682
PCT Pub. Date: Jul. 18, 2019

(65) Prior Publication Data
US 2021/0013978 A1    Jan. 14, 2021

(30) Foreign Application Priority Data
Jan. 12, 2018 (IT) .......................... 102018000000832

(51) Int. Cl.
H04H 20/33 (2008.01)
H04H 20/57 (2008.01)
(Continued)

(52) U.S. Cl.
CPC ............ H04H 20/33 (2013.01); H04H 20/57 (2013.01); H04H 20/67 (2013.01); H04H 20/71 (2013.01);
(Continued)

(58) Field of Classification Search
None
See application file for complete search history.

(56) References Cited

U.S. PATENT DOCUMENTS 8,391,878 B2 * 3/2013 Tenny ..................... H04W 4/06
455/450
8,498,262 B2 * 7/2013 Vesma ................... H04H 60/73
370/347
(Continued)

FOREIGN PATENT DOCUMENTS

CN  101536373 B  * 11/2012  ............. H04H 20/42
CN  102939786 A  *  2/2013  ............ H04L 5/0094
(Continued)

OTHER PUBLICATIONS

PCT/EP2018/082421. International Search Report (dated Feb. 12, 2019).
IT102018000000832. Search Report (dated Sep. 18, 2018).

Primary Examiner — Berhanu Tadese
(74) Attorney, Agent, or Firm — LOZA & LOZA, LLP; Kevin L. Soules

(57) ABSTRACT

The invention relates to an OFDM-based transmitter (1000) for transmitting a multiplex (M1) of one or more radio information signals in a radio transmission mode via a transmission medium. According to the invention, the transmitter comprises an input (1002) for receiving the multiplex of radio information signals, an encoding unit (1006/1010) for encoding a block of data of the multiplex of radio information signals and for generating an encoded block of data (202), and a multiplexer unit (1012) for incorporating (Continued)

the encoded block of data in a media radio subframe of a radio transmission signal. According to the invention, the transmitter is furthermore designed to receive a second multiplex (M2) of one or more radio information signals. The encoder unit (1008/1010) according to the invention is furthermore designed to encode a block of data of the second multiplex of radio information signals and to generate a second encoded block of data (204), and the multiplexer unit (1012) is furthermore designed to incorporate the second encoded block of data in the same media radio subframe of tlic radio transmission signal (Sout).

13 Claims, 11 Drawing Sheets

(51) Int. Cl.
*H04H 20/67* (2008.01)
*H04H 20/71* (2008.01)
*H04L 5/00* (2006.01)
*H04L 5/02* (2006.01)
*H04W 4/06* (2009.01)

(52) U.S. Cl.
CPC ............ *H04L 5/0007* (2013.01); *H04L 5/023* (2013.01); *H04W 4/06* (2013.01)

(56) References Cited

U.S. PATENT DOCUMENTS

| | | | | |
|---|---|---|---|---|
| 8,542,699 | B2* | 9/2013 | Wang | H04W 72/30 370/310 |
| 8,605,610 | B2* | 12/2013 | Hwang | H04L 1/0026 370/335 |
| 8,717,947 | B2* | 5/2014 | Liao | H04B 7/024 375/267 |
| 8,730,861 | B2* | 5/2014 | Montojo | H04W 72/082 370/312 |
| 8,817,736 | B2* | 8/2014 | Dinan | H04W 72/0446 370/329 |
| 8,929,215 | B2* | 1/2015 | Dinan | H04W 56/001 370/312 |
| 8,929,904 | B2* | 1/2015 | Tenny | H04W 72/30 455/450 |
| 8,937,918 | B2* | 1/2015 | Dinan | H04W 16/32 370/433 |
| 8,971,250 | B2* | 3/2015 | Dinan | H04J 11/00 370/433 |
| 9,036,577 | B2* | 5/2015 | Horiuchi | H04L 1/0046 370/329 |
| 9,049,724 | B2* | 6/2015 | Dinan | H04B 7/2656 |
| 9,088,318 | B2* | 7/2015 | Liao | H04L 1/0625 |
| 9,124,377 | B2* | 9/2015 | Wang | H04B 7/2656 |
| 9,276,709 | B2* | 3/2016 | Mazzarese | H04L 5/0048 |
| 9,277,562 | B2* | 3/2016 | Dinan | H04W 24/06 |
| 9,294,956 | B2* | 3/2016 | Anchan | H04L 65/611 |
| 9,295,060 | B2* | 3/2016 | Dinan | H04W 72/23 |
| 9,320,033 | B2* | 4/2016 | Suzuki | H04L 1/1812 |
| 9,369,256 | B2* | 6/2016 | Seo | H04L 5/001 |
| 9,432,820 | B2* | 8/2016 | Anchan | H04W 4/10 |
| 9,504,027 | B2* | 11/2016 | Seo | H04W 72/23 |
| 9,510,132 | B2* | 11/2016 | Xu | H04W 16/28 |
| 9,538,406 | B2* | 1/2017 | Yang | H04W 48/16 |
| 9,553,701 | B2* | 1/2017 | Sadeghi | H04W 72/23 |
| 9,591,429 | B2* | 3/2017 | Xu | H04W 4/70 |
| 9,591,651 | B2* | 3/2017 | Dinan | H04B 7/2656 |
| 9,596,681 | B2* | 3/2017 | Dinan | H04H 20/33 |
| 9,628,935 | B2* | 4/2017 | Anchan | H04W 4/00 |
| 9,661,394 | B2* | 5/2017 | Yun | H04H 20/57 |
| 9,668,248 | B2* | 5/2017 | Seo | H04L 5/1415 |
| 9,692,534 | B2* | 6/2017 | Jones | H04H 20/71 |
| 9,698,922 | B2* | 7/2017 | Dinan | H04W 72/23 |
| 9,730,213 | B2* | 8/2017 | Maeda | H04W 56/0045 |
| 9,749,771 | B2* | 8/2017 | Xu | H04W 28/06 |
| 9,756,663 | B2* | 9/2017 | Kim | H04W 76/40 |
| 9,788,268 | B2* | 10/2017 | Maeda | H04W 48/20 |
| 9,801,168 | B2* | 10/2017 | Moulsley | H04B 7/024 |
| 9,839,027 | B2* | 12/2017 | Xu | H04W 48/12 |
| 9,860,803 | B2* | 1/2018 | Mochizuki | H04W 36/04 |
| 9,894,674 | B2* | 2/2018 | Frankland | H04L 67/148 |
| 9,948,443 | B2* | 4/2018 | Kusashima | H04L 1/00 |
| 9,974,028 | B2* | 5/2018 | Ouchi | H04L 5/0053 |
| 10,064,217 | B2* | 8/2018 | Rajagopal | H04H 20/38 |
| 10,142,962 | B2* | 11/2018 | Lee | H04W 72/30 |
| 10,187,136 | B2* | 1/2019 | Shimezawa | H04B 17/345 |
| 10,219,267 | B2* | 2/2019 | Suzuki | H04W 40/18 |
| 10,219,269 | B2* | 2/2019 | Wang | H04L 5/0012 |
| 10,298,306 | B2* | 5/2019 | Shimezawa | H04W 72/23 |
| 10,314,078 | B2* | 6/2019 | Ouchi | H04W 72/0446 |
| 10,349,329 | B2* | 7/2019 | Faccin | H04W 28/0268 |
| 10,396,881 | B2* | 8/2019 | Akkarakaran | H04B 7/0695 |
| 10,420,066 | B2* | 9/2019 | Sadeghi | H04L 5/005 |
| 10,455,370 | B2* | 10/2019 | Park | H04L 5/0048 |
| 10,455,550 | B2* | 10/2019 | Nogami | H04W 72/20 |
| 10,477,540 | B2* | 11/2019 | Chen | H04W 76/14 |
| 10,531,445 | B2* | 1/2020 | Xu | H04B 7/0413 |
| 10,542,521 | B2* | 1/2020 | Zhang | H04W 72/23 |
| 10,575,285 | B2* | 2/2020 | Chen | H04L 1/1812 |
| 10,630,410 | B2* | 4/2020 | Parkvall | H04W 8/18 |
| 10,763,936 | B2* | 9/2020 | Shimezawa | H04B 7/0626 |
| 10,779,190 | B2* | 9/2020 | Nogami | H04W 76/27 |
| 10,805,061 | B2* | 10/2020 | Yi | H04L 5/1469 |
| 10,834,779 | B2* | 11/2020 | Shrivastava | H04W 76/40 |
| 10,855,417 | B2* | 12/2020 | Chen | H04L 5/0048 |
| 11,026,058 | B2* | 6/2021 | Lipfert | H04W 88/12 |
| 11,071,162 | B2* | 7/2021 | Patel | H04W 72/30 |
| 2009/0323574 | A1* | 12/2009 | Koskinen | H04W 48/10 370/312 |
| 2010/0097972 | A1* | 4/2010 | Parkvall | H04W 48/12 370/312 |
| 2010/0322133 | A1* | 12/2010 | Kuo | H04W 72/30 370/312 |
| 2013/0114497 | A1* | 5/2013 | Zhang | H04W 72/04 370/312 |
| 2013/0170450 | A1* | 7/2013 | Anchan | H04W 4/06 370/329 |
| 2013/0286929 | A1* | 10/2013 | Tsuboi | H04B 7/2606 370/315 |
| 2014/0016540 | A1* | 1/2014 | Barrett | H04W 16/26 370/315 |
| 2015/0043491 | A1* | 2/2015 | Eng | H04H 20/423 370/329 |
| 2015/0079979 | A1* | 3/2015 | Anchan | H04W 76/15 455/433 |
| 2015/0131516 | A1* | 5/2015 | Zhang | H04L 5/0044 370/312 |
| 2015/0349924 | A1* | 12/2015 | Wang | H04L 1/0041 714/807 |
| 2016/0234454 | A1* | 8/2016 | Kwon | H04N 21/44209 |
| 2016/0345033 | A1* | 11/2016 | Kwak | H04N 21/6175 |
| 2017/0013026 | A1* | 1/2017 | Kwak | H04L 69/24 |
| 2017/0048294 | A1* | 2/2017 | Kwak | H04L 65/762 |
| 2017/0094621 | A1* | 3/2017 | Xu | H04W 72/23 |
| 2017/0142698 | A1* | 5/2017 | Dinan | H04W 72/54 |
| 2017/0164407 | A1* | 6/2017 | Yang | H04W 74/0891 |
| 2017/0180953 | A1* | 6/2017 | Hovey | H04W 76/14 |
| 2017/0251423 | A1* | 8/2017 | Lee | H04W 4/06 |
| 2017/0257838 | A1* | 9/2017 | Patel | H04H 20/08 |
| 2017/0280273 | A1* | 9/2017 | Xu | H04W 4/70 |
| 2017/0311314 | A1* | 10/2017 | Maeda | H04W 72/27 |
| 2017/0366284 | A1* | 12/2017 | Dinan | H04J 11/00 |
| 2018/0270893 | A1* | 9/2018 | Patel | H04W 72/21 |
| 2020/0162975 | A1* | 5/2020 | Mochizuki | H04W 36/0085 |
| 2020/0314838 | A1* | 10/2020 | Maeda | H04W 56/0045 |

(56) References Cited

U.S. PATENT DOCUMENTS

| | | | |
|---|---|---|---|
| 2020/0350969 A1* | 11/2020 | Shimezawa | H04B 7/0626 |
| 2021/0013978 A1* | 1/2021 | Menzel | H04H 20/33 |

FOREIGN PATENT DOCUMENTS

| | | | | |
|---|---|---|---|---|
| CN | 104521307 A | * | 4/2015 | H04L 1/1812 |
| CN | 105075169 A | * | 11/2015 | H04L 5/0007 |
| CN | 105247813 A | * | 1/2016 | H04L 12/185 |
| CN | 106664574 A | * | 5/2017 | H04W 16/28 |
| CN | 107431493 A | * | 12/2017 | H03M 13/353 |
| CN | 107852277 A | * | 3/2018 | H04L 1/00 |
| CN | 104704884 B | * | 10/2018 | H04B 17/318 |
| CN | 109155725 A | * | 1/2019 | H04L 5/003 |
| CN | 109588059 A | * | 4/2019 | B41J 19/94 |
| CN | 110169197 A | * | 8/2019 | H02M 7/4803 |
| CN | 109327822 B | * | 10/2022 | H04B 17/318 |
| EP | 3185615 A1 | * | 6/2017 | H04B 17/318 |
| EP | 3220593 A1 | * | 9/2017 | G06F 16/95 |
| EP | 3223517 A1 | * | 9/2017 | H04H 20/93 |
| EP | 3474579 B1 | * | 12/2020 | H04B 17/318 |
| EP | 3530071 B1 | * | 10/2021 | H04L 5/0035 |
| GB | 2491335 A | * | 12/2012 | H04L 12/189 |
| JP | 2009182575 A | * | 8/2009 | |
| JP | 5157483 B2 | * | 3/2013 | |
| JP | 5313152 B2 | * | 10/2013 | H04H 20/42 |
| JP | 2015512167 A | | 4/2015 | |
| JP | 2017022720 A | * | 1/2017 | H04B 17/318 |
| JP | 6419121 B2 | * | 11/2018 | H04B 17/318 |
| JP | 7009357 B2 | * | 1/2022 | H04M 15/66 |
| TW | 201703564 A | * | 1/2017 | H04L 5/14 |
| TW | 201743583 A | * | 12/2017 | H04B 7/0617 |
| WO | WO-2008058149 A2 | * | 5/2008 | H04H 20/42 |
| WO | WO-2008100209 A1 | * | 8/2008 | H04W 48/12 |
| WO | WO-2008132692 A2 | * | 11/2008 | H04W 48/10 |
| WO | WO-2009101244 A1 | * | 8/2009 | H04H 20/426 |
| WO | WO-2010052843 A1 | * | 5/2010 | H04W 16/32 |
| WO | WO-2010073628 A1 | * | 7/2010 | H04J 11/0069 |
| WO | WO-2010073630 A1 | * | 7/2010 | H04W 48/12 |
| WO | WO-2010087172 A1 | * | 8/2010 | H04W 36/0061 |
| WO | 2010133121 A1 | | 11/2010 | |
| WO | WO-2010125738 A1 | * | 11/2010 | H04B 7/024 |
| WO | WO-2010125769 A1 | * | 11/2010 | B65H 31/3027 |
| WO | WO-2010133121 A1 | * | 11/2010 | H04W 72/005 |
| WO | WO-2010146835 A1 | * | 12/2010 | H04J 11/00 |
| WO | WO-2011025660 A1 | * | 3/2011 | H04B 1/71072 |
| WO | WO-2011039959 A1 | * | 4/2011 | H04W 36/0072 |
| WO | WO-2011039960 A1 | * | 4/2011 | H04W 36/0016 |
| WO | WO-2011163201 A1 | * | 12/2011 | H04H 20/71 |
| WO | WO-2012093582 A1 | * | 7/2012 | H04L 5/001 |
| WO | WO-2013048104 A2 | * | 4/2013 | H04H 20/72 |
| WO | WO-2014013359 A1 | * | 1/2014 | H04H 20/12 |
| WO | WO-2014055878 A1 | * | 4/2014 | H04B 17/318 |
| WO | WO-2014074680 A1 | * | 5/2014 | H04B 7/2656 |
| WO | WO-2015023604 A1 | * | 2/2015 | H04H 20/423 |
| WO | WO-2015037873 A1 | * | 3/2015 | H04H 20/24 |
| WO | WO-2016072497 A1 | * | 5/2016 | H04W 72/04 |
| WO | WO-2016076623 A1 | * | 5/2016 | G06F 16/95 |
| WO | WO-2016093537 A1 | * | 6/2016 | H04H 20/28 |
| WO | WO-2016137582 A1 | * | 9/2016 | H04B 7/0413 |
| WO | WO-2016144142 A1 | * | 9/2016 | C08K 3/04 |
| WO | WO-2016144147 A1 | * | 9/2016 | H04W 4/00 |
| WO | 2016164069 A1 | | 10/2016 | |
| WO | WO-2017019197 A1 | * | 2/2017 | H04M 15/66 |
| WO | WO-2017065590 A1 | * | 4/2017 | H04B 7/0626 |
| WO | WO-2017136021 A1 | * | 8/2017 | H04L 5/0048 |
| WO | WO-2017155611 A1 | * | 9/2017 | H04B 7/15507 |
| WO | WO-2018030185 A1 | * | 2/2018 | H04L 1/0026 |
| WO | WO-2019137682 A1 | * | 7/2019 | H04H 20/33 |
| WO | WO-2020112636 A1 | * | 6/2020 | H04H 20/18 |

\* cited by examiner

```
New SIBx of PBIMCH

- sib-TypeAndinfo
    - sibx-vxx
        - pbipmch-Config
            - pbipmch-RepetitionPeriod      OPTIONs(r32, r128, etc ...)
            - pbipmch-Offset                 OPTIONs(0, ...)
            - pbipmch-ModificationPeriod     OPTIONs(r512, ....)
            - sf-AllocInfo                   0000000000 (binary indication 10 sf)
            - .... Additional signalling information if needed
```

The definition above provides required signalling to identify in which sub frame should the UE sound a given PBIMCH channel

Fig. 8

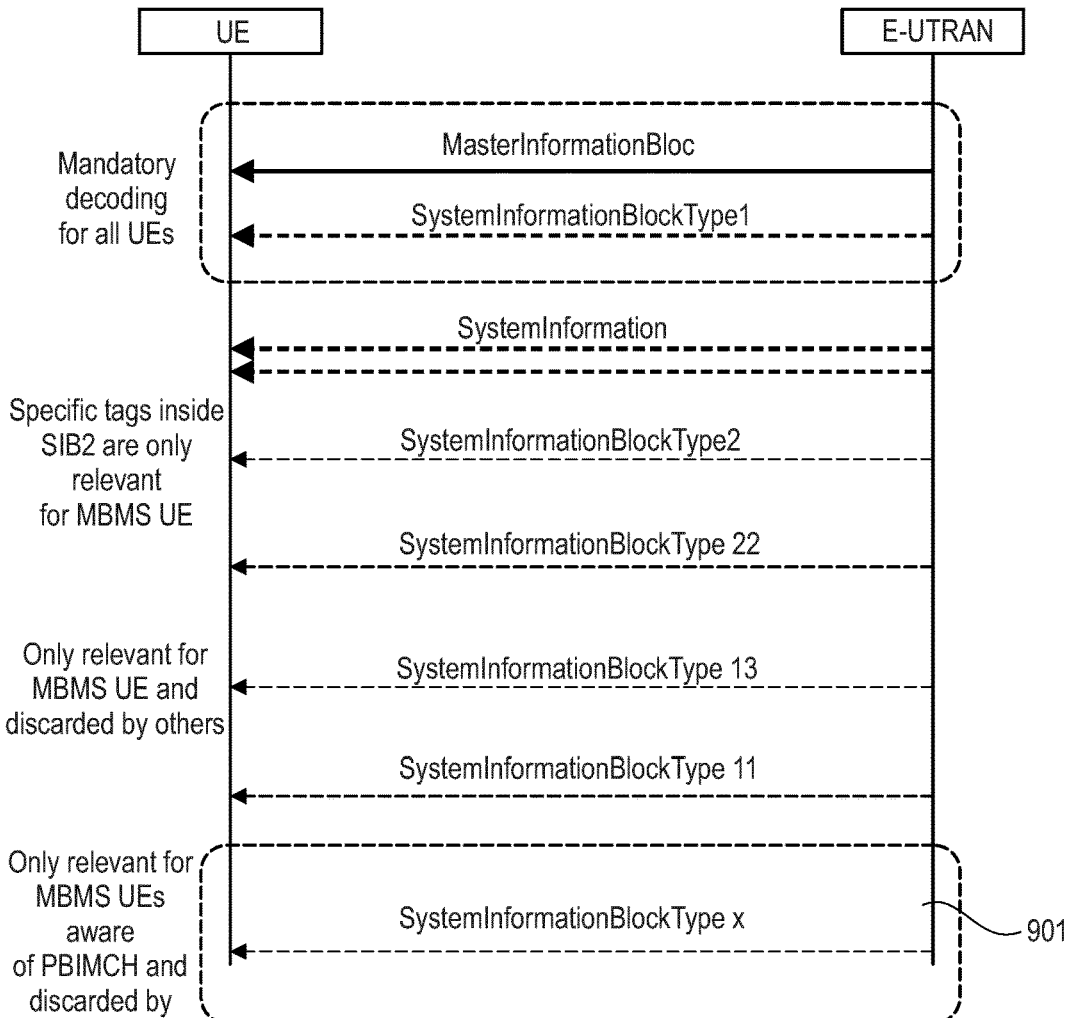

Fig. 9

SIB1 :

SystemInformation-NB-\<ver\>-IEs  : := SEQUENCE {
    sib-TypeAndInfo-\<ver\> SEQUENCE (SIZE (1..maxSIB)) OF CHOICE {
        sib2-\<ver\>  SystemInformationBlockType2-\<ver\>,
        sib3-\<ver\>  SystemInformationBlockType3-\<ver\>,
        sib4-\<ver\>  SystemInformationBlockType4-\<ver\>,
        sib5-\<ver\>  SystemInformationBlockType5-\<ver\>,
        sib13-\<ver\>  SystemInformationBlockType13-\<ver\>,
        sib14-\<ver\>  SystemInformationBlockType14-\<ver\>,
        sib16-\<ver\>  SystemInformationBlockType16-\<ver\>,
        SibX-\<ver\>  SystemInformationBlockTypeX-\<ver\>,  ⎯ 902
        ...
    },
    lateNonCriticalExtension OCTET STRING OPTIONAL,
    nonCriticalExtension SEQUENCE { } OPTIONAL
}

Fig. 9A

TRANSMITTER AND/OR RECEIVER FOR TRANSMITTING AND/OR RECEIVING RADIO INFORMATION SIGNALS

The invention relates to a transmitter for transmitting a multiplex of one or a plurality of broadcast information signals in a broadcast transmission mode according to the preamble of claim 1. Such a transmitter is known from US 20130114497A1.

The invention relates likewise to a receiver for receiving a broadcast transmission signal in a broadcast reception mode according to the preamble of claim 13. Such a receiver is likewise known from US20130114497A1.

DESCRIPTION OF THE INVENTION

The object of the invention is that of achieving improved broadcast transmission between the transmitter and the receiver. The transmitter is characterized as defined in the characterizing part of the claims. Inventive further exemplified embodiments of the transmitter are claimed.

The invention is based on the following inventive concept.

In the distribution of broadcast programs with a different range of coverage (i.e. regional and national distribution) in a multiplex, the problem exists that this multiplex cannot be broadcast at coverage boundaries in the SFN (Single Frequency Network) operation.

Reason: If two multiplexes which are emitted in neighboring coverage areas by neighboring transmitters differ only in one (or even a plurality of) programs, the entire multiplex in each neighboring coverage area cannot be emitted in the SFN operation because the two multiplexes would interfere with one another owing to the varying content. SFN functions only with identical signals or multiplexes. This problem exists fundamentally in multiplex-based program distribution, for instance in the case of DVB-T/T2, DAB/DAB+ but also in the case of MBSFN (or eMBMS) within the scope of LTE or one of the potential, future xG systems, wherein x is an integer greater than or equal to 4.

However, in the case of LTE or xG systems (but possibly also in the case of DVB and/or DAB), modifications to the current channel structures of MBSFN (or eMBMS) are possible which considerably reduce the problem and thus contribute to considerably more spectrum-efficient broadcast distribution.

The problem described exists fundamentally in the distribution of a digital broadcast by means of multiplexes. However, it becomes particularly evident when not only audio/video programs ("television") but also purely sound radio (DAB-via-MBSFN/eMBMS) or mixtures of sound broadcasting and television broadcasting are transmitted e.g. by means of LTE-MBSFN (or LTE-eMBMS) or xG-MBSFN (or xG-eMBMS). The reason for this is that individual sound radio programs have considerably smaller data rates than television (around 128 kbps for sound radio compared to 1.5 to 4 Mbps for television.

As a result, considerably more sound radio programs than television programs can be transmitted per MBSFN (or eMBMS) channel, thus increasing the probability of the occurrence of the above-described combination that spatially neighboring multiplex contents differ in terms of regional programs.

The aforementioned problem is solved by virtue of the fact that a plurality of clearly separable multiplexes are transmitted in one MBSFN (or eMBMS) channel. In other words, by virtue of the fact that in the media broadcast subframes (such as MBSFN subframes or eMBMS subframes) separately encoded blocks for each of the at least two multiplexes to be transmitted are transmitted by one or a plurality of broadcast information signals, they are separately accessible and also then separately decodable when received in a receiver. Clearly separable or separately decodable means that the multiplexes are allocated to individual or groups of physical resource blocks of the media broadcast subframes (such as MBSFN subframes or eMBMS subframes). If such multiplexes are identical, then the associated physical resource blocks or subcarriers can be transmitted in the SFN mode. They are not disrupted by other multiplexes because the contents thereof are located on other physical resource blocks or subcarriers.

The additional advantage of the invention is that, by virtue of the fact that now separately an encoded block of data of a multiplex can be read out from a media broadcast subframe (such as an MBSFN subframe or an eMBMS subframe) and separately decoded, the computing time in a receiver is substantially reduced and so battery power is saved.

In contrast to the previous eMBMS, the subdivision of a media broadcast subframe (such as an MBSFN subframe or an eMBMS subframe) or a media broadcast channel (such as an MBSFN channel or an eMBMS channel) into a group of subcarriers and/or PRBs (Physical Resource Blocks), in which separate multiplexes are transmitted in a chronologically parallel manner, is a first. This option hitherto did not exist, as a result of which multiplexes must always comprise at least one complete subframe of a broadcast transmission frame (such as an LTE frame or an xG frame).

This provides the advantage of simple implementation: there is no change to the hitherto existing basic principle of broadcast transmission modulation (such as LTE-OFDM modulation or xG modulation) because e.g. no different lengths of OFDM symbols or resource elements in a subframe or variable subcarrier intervals within a subframe have to be used. As a result, changes of the OFDM method used are not required for carrying out the invention.

The advantage of the invention resides in the more spectrum-efficient distribution of broadcast programs, specifically sound radio programs because the multiplexes used can be smaller in configuration and some of the smaller multiplexes can be distributed in the spectrum-efficient SFN operation (e.g. for national, cross-regional programs). These multiplexes are not adversely affected by some merely regionally distributed programs because the multiplexes thereof are separated.

It should also be mentioned here that where reference is made to a multiplex, this is to be understood to mean either only a broadcast information signal or a plurality of broadcast information signals which are processed and transmitted together. In this case, a broadcast information signal is to be understood to mean as follows: either a video/television information signal or a video/television information signal and an associated audio information signal or only an audio information signal or an information signal comprising other information.

It should also be mentioned that where reference is made in the claims to a first-named multiplex and a second multiplex, the invention naturally comprises an exemplified embodiment in which three or a plurality of multiplexes are transmitted in one media broadcast subframe.

BRIEF DESCRIPTION OF THE FIGURES

The invention will be explained in more detail with the aid of the following description of the figures. In the drawing:

FIG. 8 shows the structure of a system information block SIBx proposed in accordance with the invention for signaling the position of the first control signal, FIG. 9 shows the signaling procedure of FIG. 6, extended with the transmission of the System Information Block SIBx from the transmitter to the receiver, FIG. 9A shows the content of the System Information Block SIB1.

DETAILED DESCRIPTION OF THE FIGURES

Figure 1:
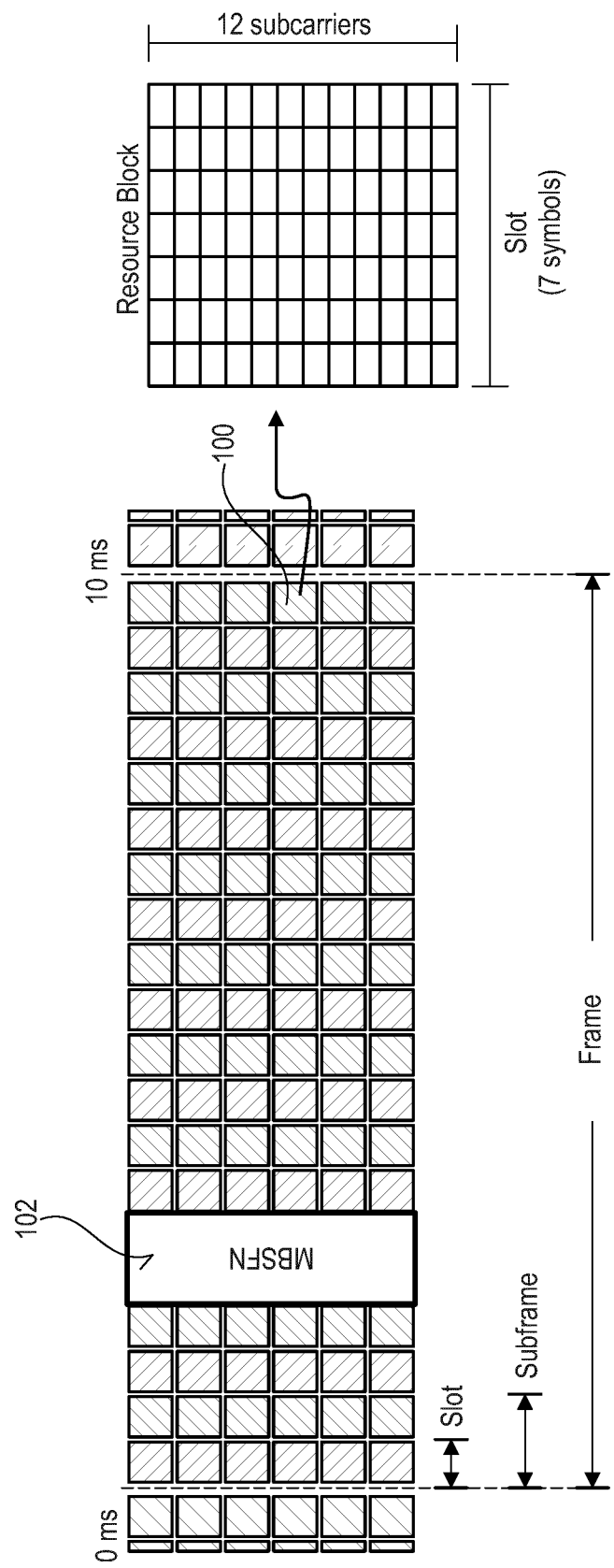
FIG. 1 shows a media broadcast subframe (such as an MBSFN subframe) according to the prior art.

FIG. 1 shows an exemplified embodiment of a media broadcast subframe 102 according to the prior art. A media broadcast subframe can be an MBSFN subframe, as contained in an LTE frame, or as can be contained in an xG frame, wherein x is an integer greater than 4 (i.e. a 4G frame, a 5G frame).

MBSFN stands for "MBMS Single Frequency Network", wherein MBMS means "Multimedia Broadcast Multicast Service".

An MBSFN subframe is called an LTE (Long Term Evolution) also eMBMS subframe (Evolved Multimedia Broadcast Multicast Services).

FIG. 1 shows a media broadcast subframe in the case of a channel bandwidth of 1.4 MHz. According to the current LTE-/5G standard, only one multiplex is transmitted in an MBSFN (or eMBMS) channel via a PMCH (Physical Multicast Channel) which represents an MBSFN (or eMBMS) subframe, as illustrated in FIG. 1.

LTE frames are described and defined in detail in the LTE/3GPP standard specification. In this exemplified embodiment, the LTE frame contains ten subframes, each consisting of two slots. The time is represented horizontally and the frequency for the frequency values of the OFDM frequency carrier is represented vertically. As can be seen in FIG. 1, the frame duration of a frame is 10 ms. In the vertical direction, the frequency range is subdivided into six sub-ranges. As a result, each slot contains six so-called resource blocks, as indicated by the reference numeral 100.

Only one MBSFN (or eMBMS) subframe is contained in the LTE frame shown. However, a plurality of MBSFN subframes can be contained in the LTE frame. Consecutive frames likewise contain one or a plurality of MBSFN subframes and thus form an MBSFN channel, via which one or a plurality of multiplexes can be transmitted by in each case one or a plurality of broadcast information signals. In the case of broadcast information signals it is necessary to consider digital television signals (i.e. video and/or audio information signals) or digital sound radio signals.

The MBSFN subframes are generated by a transmitter which operates in an MBSFN broadcast transmission mode. The other subframes in the LTE frame which are not used for MBSFN transmission are used for a unicast transmission and are thus generated by the transmitter if the transmitter is operating in a unicast transmission mode.

If e.g. three multiplexes are to be transmitted by in each case one or a plurality of broadcast information signals in the MBSFN channel (in the MBSFN frames), in a transmitter according to the prior art blocks of data of the three multiplexes are collectively encoded in order to obtain an encoded block of data of the three multiplexes. The encoded block of data is stored in an MBSFN subframe 102 and then transmitted. During reception, the entire MBSFN subframe must be read out and completely decoded in order to obtain the data from one of the three multiplexes.

Figure 2:
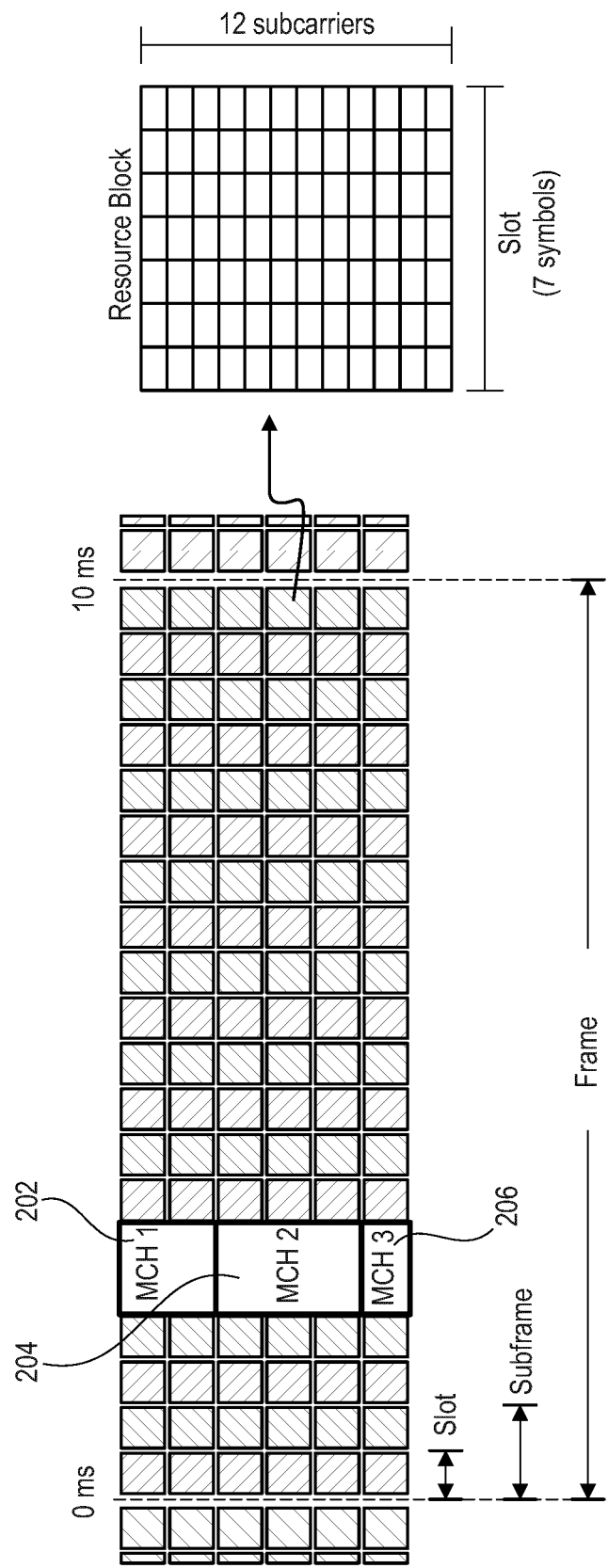
FIG. 2 shows a first exemplified embodiment of a media broadcast subframe (such as an MBSFN subframe) according to the invention.

According to the invention, it is now proposed to encode the blocks of data of the three multiplexes separately into encoded blocks of data and to store same in an MBSFN subframe such that during reception these blocks of data are separately accessible and also then separately derivable and separately decodable from the broadcast transmission signal. This is indicated in FIG. 2. As a result, a plurality of narrower MBSFN channels are transmitted at the same time in one subframe. In the channel model of LTE, these MBSFN channels would correspond to separate Physical Multicast Channels PMCHs. The MBSFN subframe illustrated in FIG. 2 has three encoded blocks of data 202 (MCH1), 204 (MCH2) and 206 (MCH3) stored therein.

During reception and assuming that the user of the receiver wishes to receive a broadcast information signal from the first multiplex (which is transmitted in the encoded blocks MCH1 in consecutive MBSFN subframes), the user needs only to read out the blocks MCH1 from the MBSFN subframes. Since these blocks contain data which are separately decodable, the first multiplex can thus be received and decoded in order to derive from this first multiplex one of the broadcast information signals such that it can be viewed (in the case of a television signal) or heard (in the case of a sound radio signal).

The advantage resides in the fact that as a result only one encoded block of a multiplex can be separately read out from an MBSFN subframe and decoded, the computing time in a receiver is substantially reduced and so the battery power in the receiver is saved.

As can be seen in FIG. 2, the encoded blocks of data of the three multiplexes of broadcast information signals incorporated in the MBSFN frame 202 are an integer multiple of resource blocks 100 large, namely 4 or 6 or 2 resource blocks. It can also be more if the LTE channel is e.g. 5 MHz or 20 MHz wide.

Alternatively, a plurality of MBSFN transport channels (Multicast Channel—MCH) can be transmitted via a PMCH which constitutes an MBSFN subframe, wherein each MCH comprises a number of subcarriers of the MBSFN subframe which is to be configured individually or a number of physical resource blocks PRB which is to be configured individually.

Figure 3:
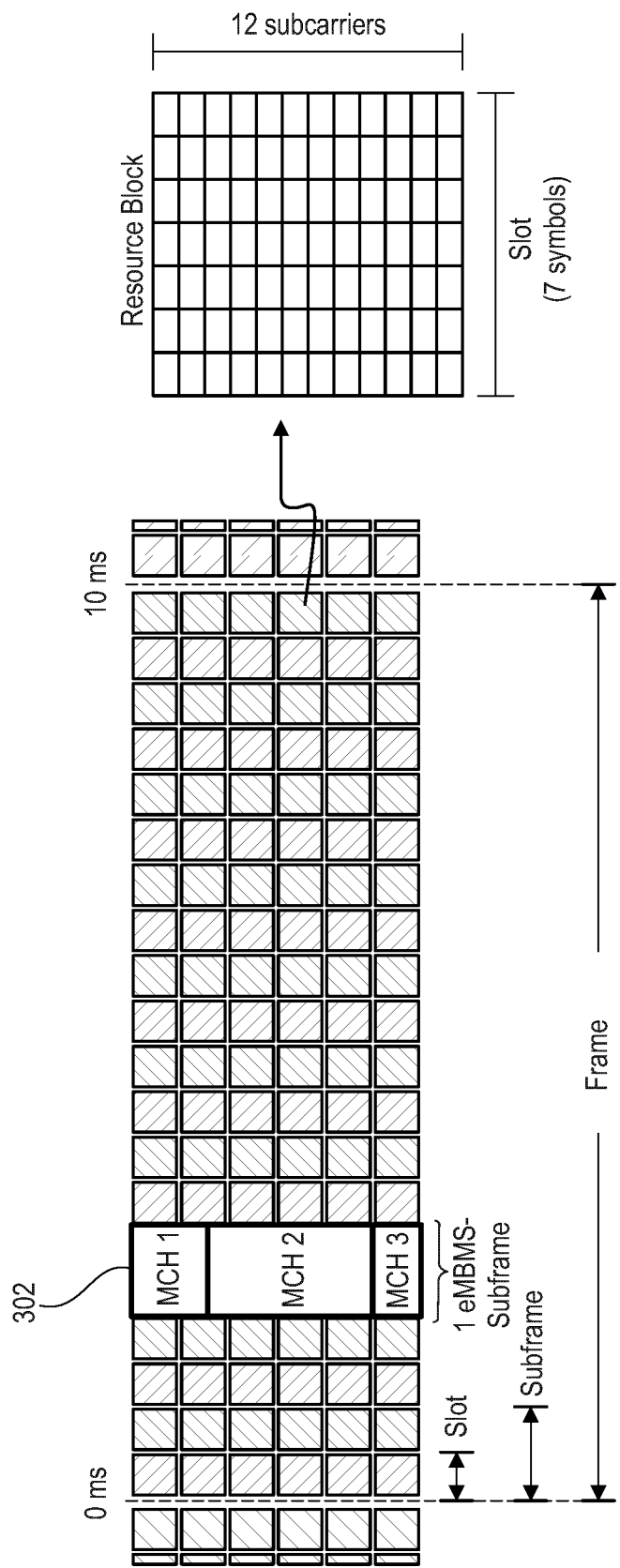
FIG. 3 shows a second exemplified embodiment of a media broadcast subframe (such as an MBSFN subframe) according to the invention.

The size of the subblocks MCH1, MCH2 and MCH3 are now a non-integer number of the resource blocks 100, as shown for the subblocks MCH1 and MCH2 in the MBSFN subframe 302 in FIG. 3.

In further exemplified embodiments of the invention, an MBSFN channel can also extend over a plurality of subframes.

As already in the case of the existing MBSFN, information relating to the existence of the MBSFN channel are to be transmitted from the network to the terminals, e.g. in the form of so-called system information messages. This information should be extended in order to transmit information for describing the number, position and configuration of the individual PMCHs or MCHs so that receivers (terminals) can detect the multiplexes contained therein. It is important that broadcast receivers in general have only one reception function and no transmission function in order to connect to a transmitter. This has consequences in how receivers behave after being switched on, how a receiver can find out the structure of the broadcast channels.

This will be explained in greater detail with reference to FIG. 4 and subsequent figures.

Figure 4:
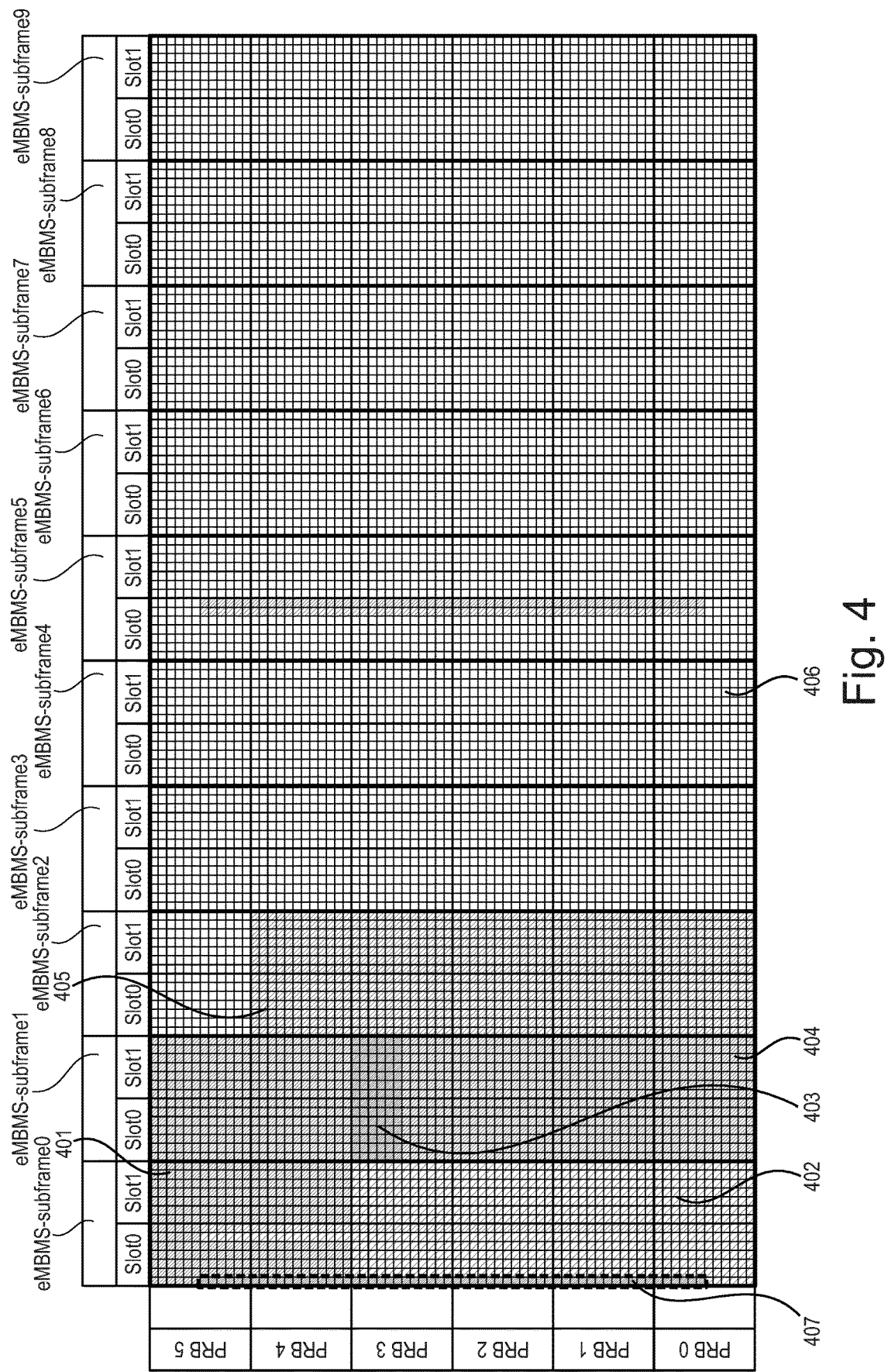
FIG. 4 shows a third exemplified embodiment of a media broadcast subframe (such as an MBSFN subframe) according to the invention.

FIG. 4 shows an exemplified embodiment, wherein the transmitter transmits only multiplexes in all MBSFN subframes of a frame. In FIG. 4, this relates to six multiplexes, 401 to 406, wherein one of the multiplexes has an encoded block of data 401 in the first MBSFN subframe and also has an encoded block of data in the second MBSFN subframe in the frame. In addition, a first control signal, a so-called Broadcast Information Message BIM (not yet specified in the LTE-/xG standard specification) is transmitted in a physical BIM channel PBIMCH 407.

This first control signal BIM indicates where the encoded blocks of data of the multiplexes are located in an MBSFN subframe and/or the size of the encoded blocks of data of the multiplexes in an MBSFN subframe. FIG. 4 shows an exemplified embodiment, wherein the first control signal indicates the position or size of the blocks of data of the multiplexes in the frame.

This BIM channel PBIMCH 407 could be contained e.g. in the first MBSFN subframe of the frame, as also shown in FIG. 4. This PBIMCH 407 is transmitted in a number of resource elements in the LTE-/5G frame. Preferably, as is also apparent in FIG. 4, the PBIMCH channel 407 is formed by resource elements which are located around the central frequency of the LTE-/5G channel.

By virtue of the fact that the content of the Broadcast Information Message BIM does not change frequently, the capacity utilization of the PBIMCH channel 407 is restricted. As a result, only several to the point of only one OFDM system of each LTE-/xG frame are also required for transmitting the PBIMCH channel 407. Preferably, the first OFDM symbol of the first subframe (subframe number zero) of each LTE-/xG frame is used for this purpose.

Figure 4A:
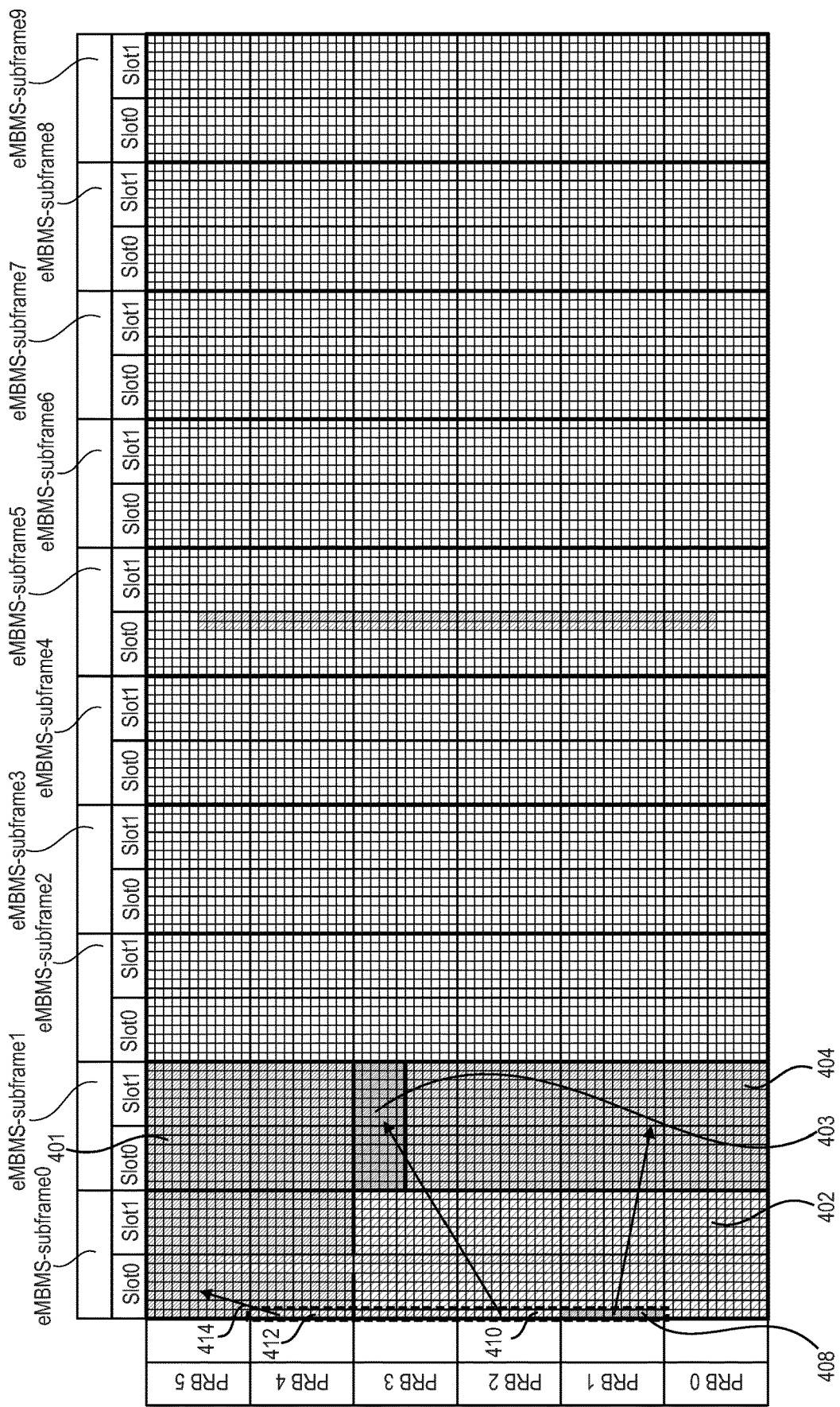
FIG. 4A shows a fourth exemplified embodiment of a media broadcast subframe (such as an MBSFN subframe) according to the invention.

FIG. 4A shows an exemplified embodiment of an LTE/xG frame which looks similar to the LTE/xG frame in FIG. 4. In this case, the frame also contains only media broadcast subframes (MBSFN or eMBMS subframes). In this exemplified embodiment, these media broadcast subframes contain only four multiplexes of one or a plurality of broadcast information signals, indicated by the reference numerals 401, 402, 403 and 404. This means that the media broadcast subframes 3 to 10 are empty in this case. In this case, the BIM channel PBIMCH is also contained in the first media broadcast subframe of the frame. It is evident that the first control signal BIM contains four partial control signals 408, 410, 412 and 414. These partial control signals refer to the position of the encoded blocks of data of the multiplexes in the LTE/xG frame. For instance, the partial control signal 408 refers to the position of the encoded block 404, the partial control signal 410 refers to the position of the encoded block 403, the partial control signal 412 refers to the position of the encoded block 402 and the partial control signal 414 refers to the position of the encoded block 401 of a multiplex which, in this exemplified embodiment, extends over 2 MBSFN subframes.

Figure 5:
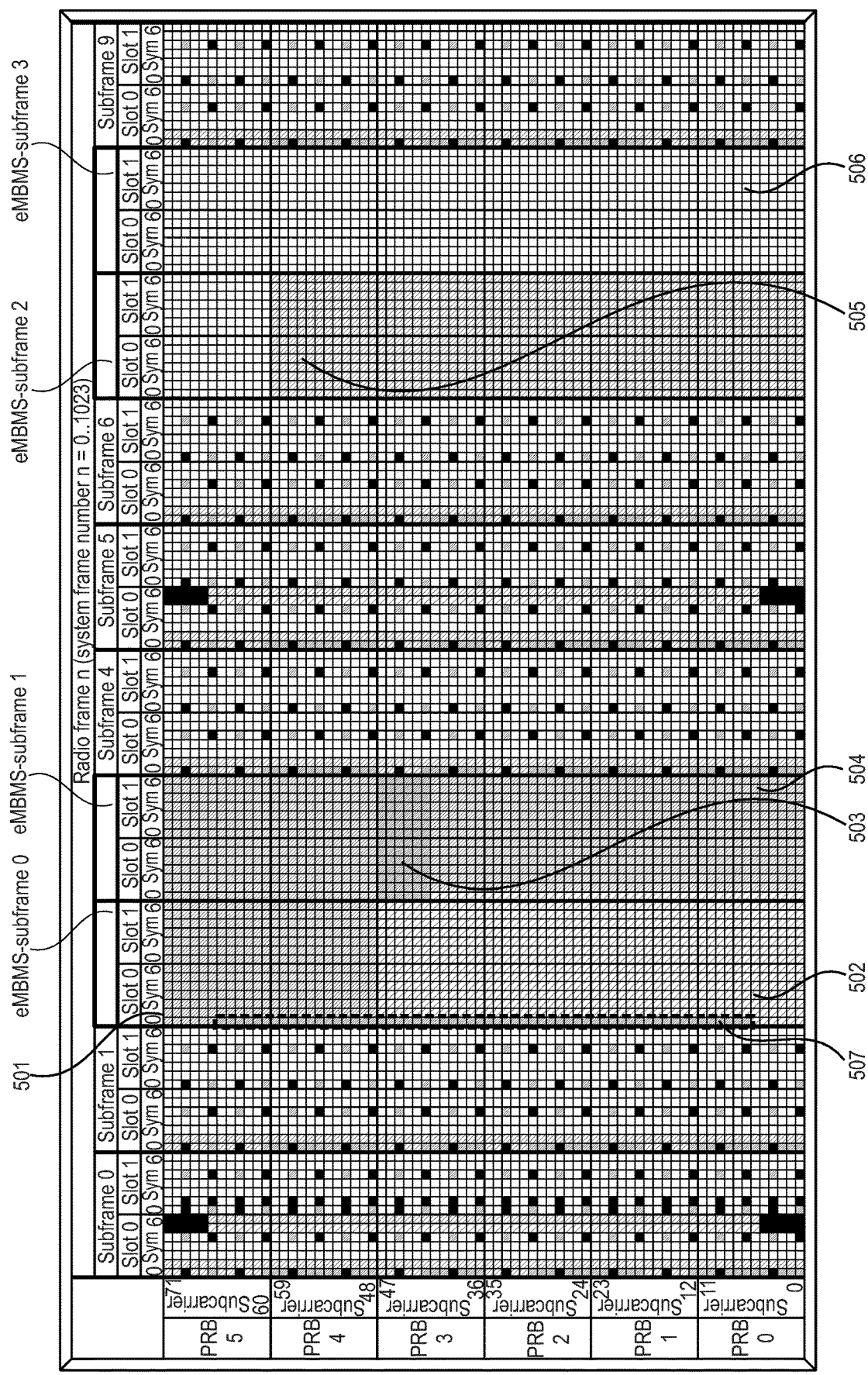
FIG. 5 shows a fifth exemplified embodiment of a media broadcast subframe (such as an MBSFN subframe) according to the invention.

FIG. 5 shows an exemplified embodiment in which the LTE-/xG frame contains 4 MBSFN subframes. In this exemplified embodiment, the remaining subframes in the frame can be used for other purposes, such as e.g. unicast connections. FIG. 5 shows MBSFN subframes in the subframes 2, 3, 7 and 8. In the exemplified embodiment of FIG. 5, encoded blocks of data of six multiplexes, 501 to 506, are transmitted within the 4 MBSFN subframes. The Broadcast Information Message BIM is now transmitted in the physical BIM channel PBIMCH 507. In this exemplified embodiment, the BIM channel PBIMCH 507 is again preferably formed by resource elements which are located around the central frequency of the LTE-/5G channel, and the first OFDM symbol or the first OFDM symbols of the first MBSFN subframe is again preferably used in order to transmit the PBIM channel 507. In addition, in this exemplified embodiment a second control signal, an indication IND, is required in order to indicate in which MBSFN subframe the BIM channel PBIMCH 507 is located. Where this second control signal is stored in the broadcast transmission signal will be explained later.

According to the current LTE-/xG standard specification, e.g. Rel 13 or 14, the first subframe with the subframe number zero contains signaling channels such as PCH, SCH, PBCH (Physical Broadcast Channel). Further signaling channels such as PDCCH (Physical Downlink Control Channel), PDSCH (Physical Downlink Shared Channel) can be contained in further subframes.

The PBCH indicates where in the LTE frame the physical resources (Physical Resource Blocks) of the PDCCH are assigned and again the PDCCH indicates where the physical resources of the PDSCH are assigned. The information relating to the configuration of the radio cell (e.g. MIB, SIB1 and for MBSFN the SIB2, SIB13 and optionally a new SIBx are transmitted to the LTE/5G terminals via PBCH and PDSCH. In order to allow the MBSFN-enabled LTE/xG terminal to quickly locate the MBSFN subframes, the PBIMCHs and thus the position of the encoded blocks of data of the multiplexes, it is recommended to incorporate the aforementioned indication IND into the list of the system information blocks, e.g. in the form of a new SIBx message as in the exemplified embodiment of FIGS. 8 and 9.

This will be explained further below.

There now follows an illustration how particularly for the exemplified embodiment shown in FIG. 5 the signaling (specifically the system information messages) could be extended so that the existence and the position of the PBIMCH within the MBSFN subframe can be signaled. In this variant, this is effected by a new System Information Block x (SIBx). This SIBx (the inventive second control signal) is transmitted as in the case of e.g. SIB2 and SIB13 of the previous MBSFN within the subframes not configured for MBSFN. In the exemplified embodiment shown in FIG. 4, the LTE frame contains only MBSFN subframes and the position of the PBIMCH or the procedure for locating the PBIMCH within the LTE frame can be fixedly defined in the standards (e.g. as already described above in connection with FIG. 4). Then, the second control signal is not required.

Figures 6, 7:
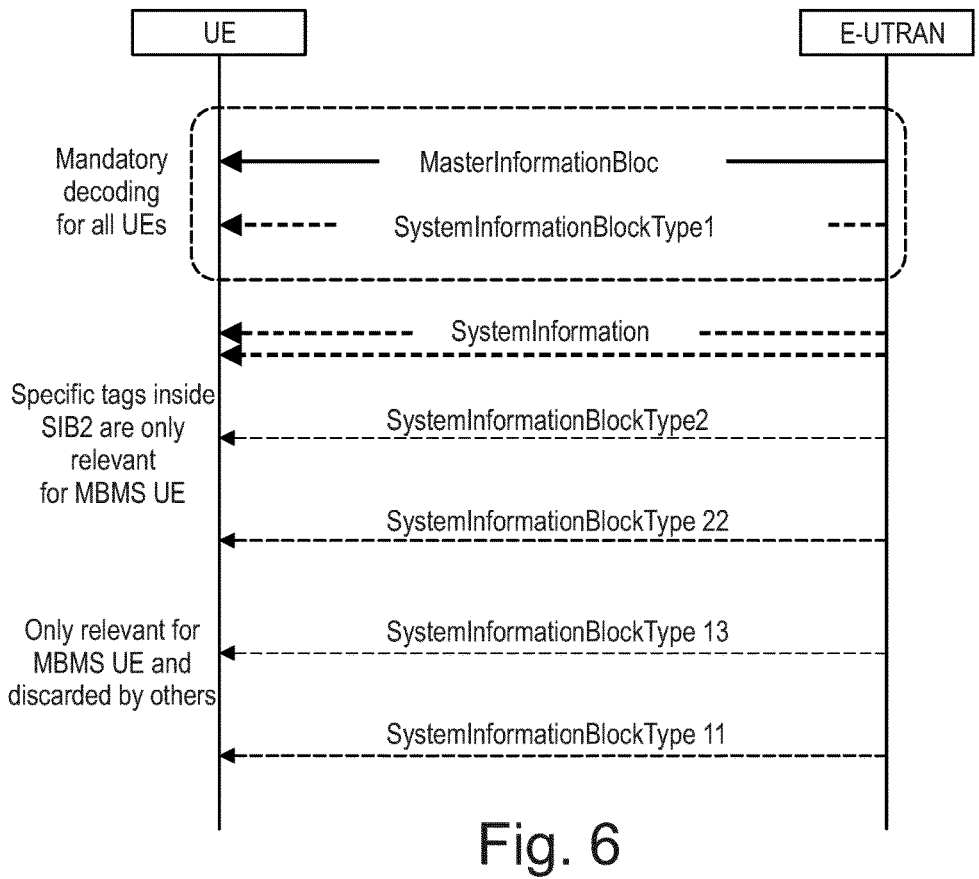
FIG. 6 shows a signaling procedure between a transmitter and a receiver in a transmission network.
FIG. 7 shows the structure of the system information blocks SIB2 and SIB 13, as set forth in the LTE-/xG standard specification.

FIG. 6 schematically shows the signaling procedure between the transmitter (E-UTRAN=Evolved UMTS Terrestrial Radio Access Network) and the receiver (UE=User Equipment), as hitherto defined in the LTE-/xG standard specification. This relates in particular to the system information defined in the standard. The specific system information which the receiver requires depends particularly upon the reception properties of the receiver UE.

In the case of MBMS (=Multimedia Broadcast Multicast Service), specific System Information Blocks (SIBs) are standardized.

For example:

System Information Block 2 (SIB2) for identifying specific MBSFN subframes which are contained in an LTE-/4G or 5G frame.

System Information Block 13 (SIB13) is used to inform the transmitter where the MCCH of an eMBMS system is transmitted.

FIG. 7 shows the structure of the System Information Block SIB2 and SIB13, as set forth in the LTE standard.

No further description is required because the above-described signaling method in connection with FIGS. 6 and 7 is described in detail in documents relating to LTE.

FIG. 9 schematically shows the signaling procedure of FIG. 6 between the transmitter (E-UTRAN=Evolved UMTS Terrestrial Radio Access Network) and the receiver (UE=User Equipment), extended with a transmission step 901, wherein in addition and in accordance with the invention, the transmitter transmits the system information block SIBx which is received by the receiver.

FIG. 9A shows how in SIB1 in FIG. 9 in the list of system information blocks used the existence of a new SIBx message is displayed to the receivers by adding the information "SibX-<ver> SystemInformationBlockTypeX-<ver>", see FIG. 9a, reference numeral 902.

If a receiver is switched on and MBSFN subframes and also unicast subframes in the LTE frame are transmitted by the transmitter (FIGS. 1, 2, 3 and 5), the receiver performs the procedures for synchronization (PSS—Primary Synchronization Signal, SSS—Secondary Synchronization Signal) known in LTE/5G, in order to find the specific, inventive system information SIBx (the second control signal) via PBCH, PDCCH and PDSCH. The system information SIBx and further system information indicates to the receiver where, in the case of the exemplified embodiment of FIG. 5, the MBSFN subframes are located in the LTE frame and specifically where the PBIMCH is located within the MBSFN subframe. The PBIMCH information indicates to the receiver where on the MBSFN subframes the respective possibly SFN-area-specific MBSFN channels are located which contain the encoded blocks of the multiplexes of the broadcast information signals. Therefore, in the case of the exemplified embodiment of FIG. 5, the receiver can derive e.g. a multiplex from the broadcast transmission signal and derive a television or sound radio program from the multiplex and output same at an output.

Cell phones which can handle unicast and therefore cannot decode any MBSFN subframes are not influenced by the existence of the MBSFN subframes. They ignore the system information SIBx transmitted by means of PBCH, PDCCH and PDSCH. They use the subframes, which are not configured as MBSFN subframes, for unicast connections.

If, as in the exemplified embodiment of FIG. 4 and FIG. 4A, all subframes of the LTE frame are configured as MBSFN frames, then there is also no PBCH, PDCCH, PDSCH etc. in the LTE frame. The receiver recognizes this situation by virtue of the fact that there is no PBCH in this LTE frame. In this case and after being switched on, the receiver also performs a synchronization procedure (PSS—Primary Synchronization Signal, SSS—Secondary Synchronization Signal). However, after it has synchronized to the LTE frame (i.e. time position and subframe numbering is known to the receiver), it immediately decodes the PBIMCH (the first control signal) where it discovers from the PBIMCH information where on the MBSFN subframes the respective possibly SFN-area-specific MBSFN channels are located which contain the multiplexes of the broadcast information signals.

Receivers or terminals which do not have any MBSFN or eMBMS functionality, i.e. which are not MBSFN-enabled mobile devices or smartphones cannot process a transmission signal as shown in FIG. 4. However, MBSFN (or eMBMS) reception-enabled receivers will perform a search procedure to detect the PBIMCH channel 407 in order to extract the BIM information therefrom. If the receiver has found the BIM information, the receiver knows the PMCH structure and the position of the various MBSFN (or eMBMS) channels in the MBSFN/eMBMS subframes. The receiver can then extract and decode the desired MBSFN channel (multiplex) and output the thus obtained video and/or audio data stream.

For current broadcast applications, it is to be expected that the number and the mode of the multiplexes of the broadcast programs to be transmitted and thus the structure of the PMCHs change only infrequently. That could change in the future with the introduction of new services and applications. Therefore, it is necessary that the receiver regularly reads out the PBIMCH information in order to establish changes in the PMCH structure and the content of the programs.

This method of broadcast transmission in accordance with the invention differs substantially from hitherto specified and standardized MBSFN.

Figure 10:
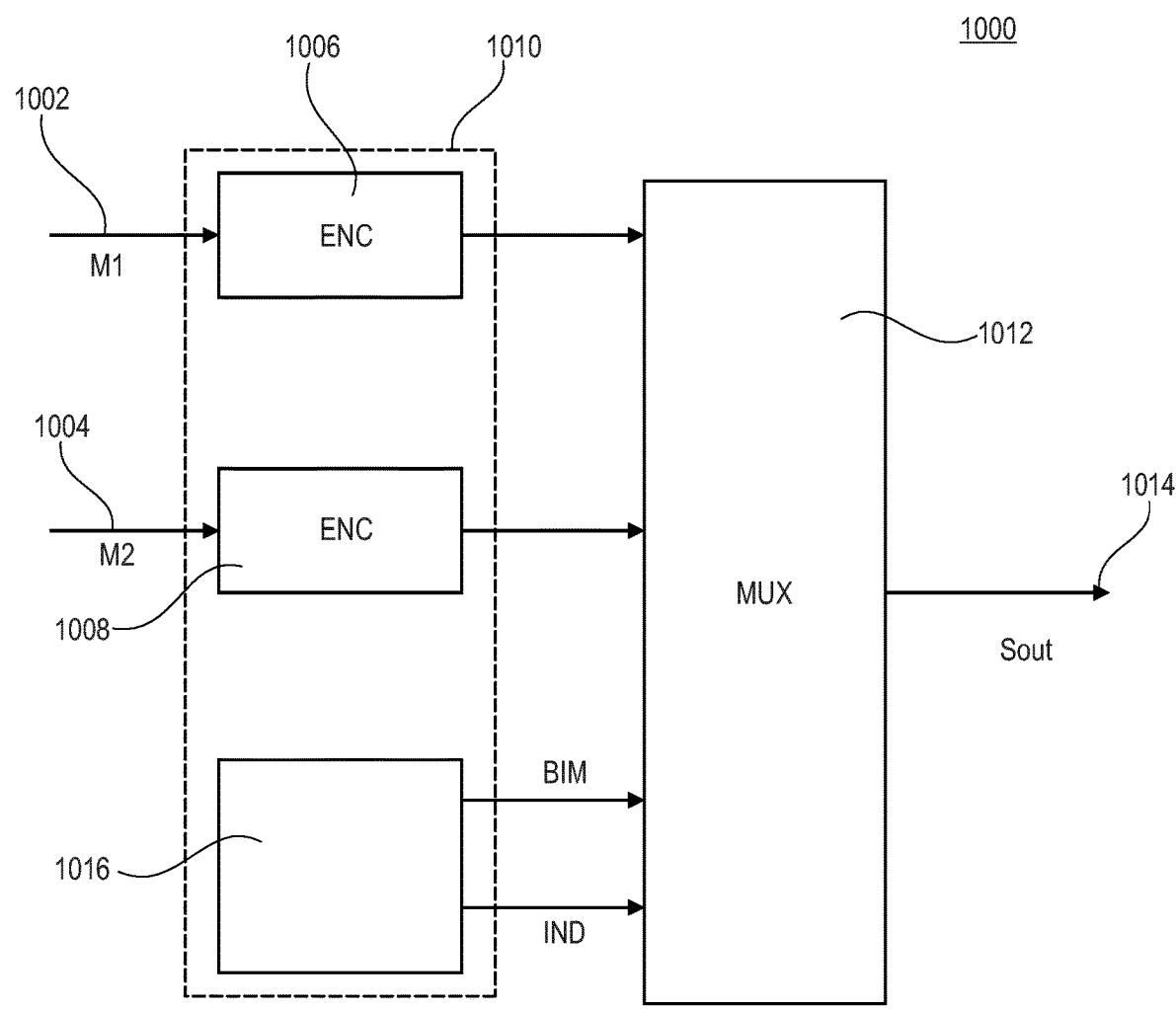
FIG. 10 shows an exemplified embodiment of a transmitter according to the invention.

FIG. 10 schematically shows an exemplified embodiment of a transmitter 1000 in accordance with the invention. As stated, the OFDM-based transmitter 1000 is configured to transmit a plurality of at least two multiplexes of broadcast information signals in an MBSFN broadcast transmission mode via a transmission medium. FIG. 10 shows an exemplified embodiment, wherein the transmitter 1000 transmits two multiplexes of broadcast information signals.

For this purpose, the transmitter has an input (the sub-inputs 1102 and 1004) for receiving the at least two multiplexes of broadcast information signals 51 or S2. For this purpose, the transmitter contains an encoding unit 1010 which contains two sub-encoding units 1006 and 1008 for encoding the multiplexes of broadcast information signals 51 or S2. Therefore, the encoding unit 1010 is constructed of two sub-encoding units because each sub-encoding unit 1006 and 1008 separately encodes blocks of data of the multiplexes M1 or M2 into encoded blocks of data which are thus also separately decodable. The transmitter 1000 further contains a multiplexer unit 1012 which is configured to incorporate the encoded blocks of data of the two multiplexes into an MBSFN subframe of a broadcast transmission signal Sout, as already described with reference to FIGS. 2 to 5. The thus obtained broadcast transmission signal Sout is provided at an output 1014.

The transmitter 1000 further contains a control signal generator unit 1016 for generating the first control signal BIM. This control signal BIM is a measure of the size of the encoded blocks of data of the two multiplexes and/or is a measure of the position where the encoded blocks of data of the two multiplexes are contained in an MBSFN subframe.

This control signal BIM is likewise provided to the multiplexer unit 1014 and the multiplexer unit 1012 ensures that this control signal BIM is incorporated in the broadcast transmission signal. In the case of an OFDM system, the multiplexer unit also performs, inter alia, the IFFT with the encoded blocks. The thus obtained broadcast transmission signal Sout is provided to an output 1014 and then transmitted.

In the event that the transmitter 1000 is an LTE- or an xG- (x is greater than or equal to 4) compatible transmitter for transmitting LTE frames which contain one or a plurality of MBSFN subframes, the control signal BIM is a measure of the size of the encoded blocks of data of the two multiplexes and/or is a measure of the position where the encoded blocks of data of the two multiplexes in the MBSFN subframes are incorporated in an LTE/xG frame and the multiplexer unit 1012 is configured to store the control signal BIM in this LTE/xG frame. Preferably, the control signal BIM is stored in the first MBSFN subframe of an LTE/xG frame.

The multiplexer unit 1012 can be further configured to store the control signal BIM in spectrally adjacent resource blocks around the central frequency of the LTE/xG channel, as also shown in FIGS. 4 and 5.

If the LTE frame also contains non-MBSFN subframes (exemplified embodiment of FIG. 5), the control signal generator unit 1016 is additionally configured to generate the second control signal IND. As already mentioned above, the second control signal IND is a measure of the position of the first control signal PIM in an LTE/xG frame. This control signal IND is provided to the multiplexer unit 1012 and the multiplexer unit 1012 ensures that this control signal IND is incorporated into the signaling channels in the non-MBSFN subframes. Preferably, the multiplexer unit 1012 stores the second control signal IND in the PBCH information of an LTE frame.

Figure 11:
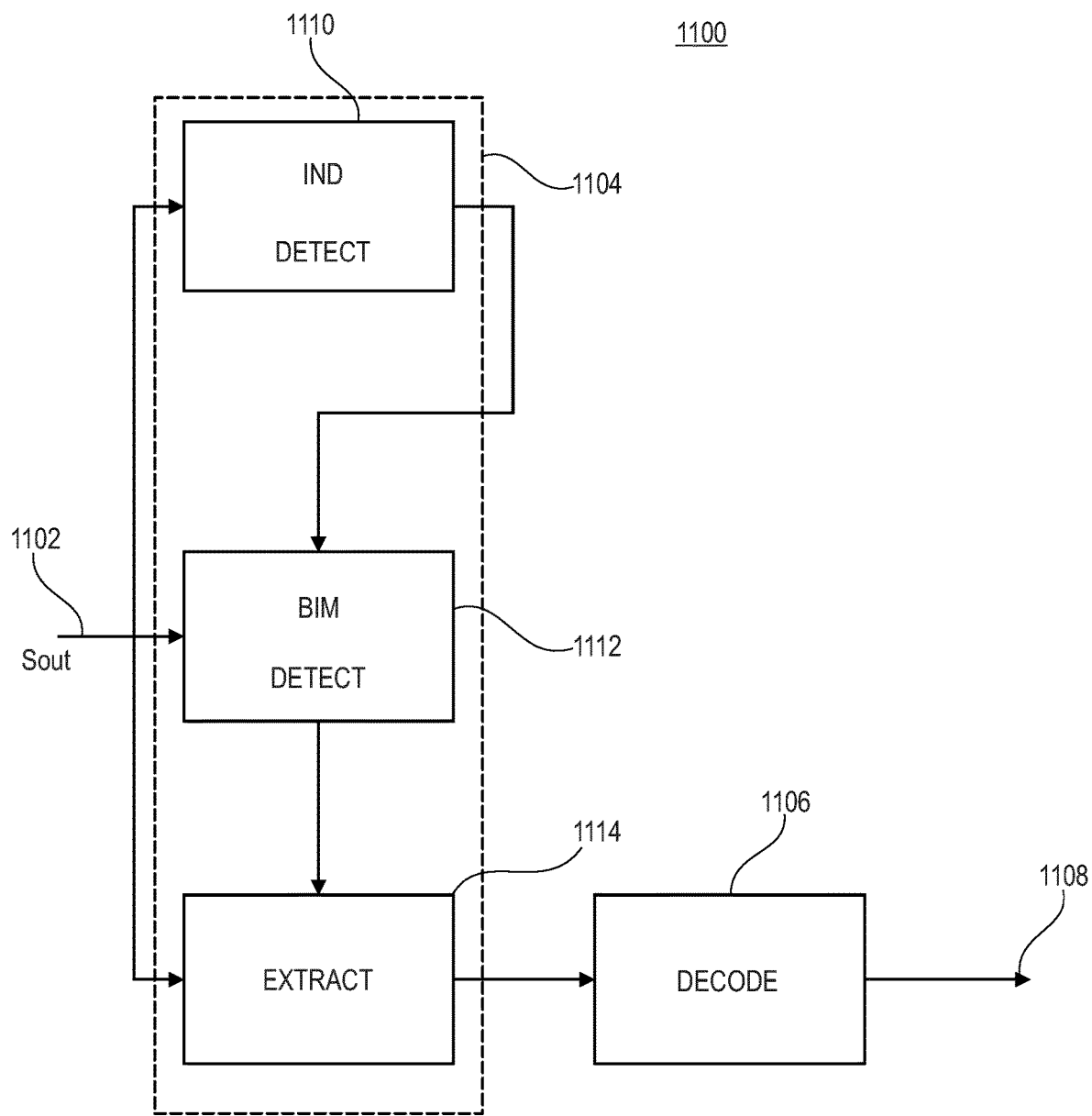
FIG. 11 shows an exemplified embodiment of a receiver according to the invention.

FIG. 11 shows an exemplified embodiment of a transmitter 1100 in accordance with the invention. As stated, the OFDM-based receiver 1100 is configured to receive, in an MBSFN reception mode, a broadcast transmission signal Sout in the manner it has been transmitted by the transmitter in FIG. 10.

The receiver 1100 contains an input 1102 for receiving the broadcast transmission signal Sout, and contains a decoding unit 1106 for decoding an encoded block of data of a multiplex (M1 or M2) for obtaining a decoded block of data of the multiplex (M1 or M2). This multiplex contains one or a plurality of broadcast information signals. Depending upon which broadcast information signal from the multiplex the user of the receiver 110 wishes to receive, the decoding unit 1106 additionally selects a broadcast information signal from the multiplex and guides this broadcast information signal to the output 1108.

The encoded blocks of data of the multiplex (M1 or M2) are derived by an extracting unit 1114 from the MBSFN subframes in the broadcast transmission signal. Furthermore, an IND DETECT unit 1110 and a BIM DETECT unit 1112 are also provided which, together with the extracting unit 1114, form a demultiplexer unit 1104.

If the LTE frame also contains non-MBSFN subframes (exemplified embodiment of FIG. 5), the IND DETECT unit 1110 derives the second control signal IND, as stored in the SIBx block, from the transmission signal Sout. This means: the information relating to where in the LTE frame the PBIMCH is located, and relays this information (i.e. the second control signal) to the BIM DETECT unit 1112. The BIM DETECT unit 1112 then derives the PBIMCH information (i.e. the first control signal) from the transmission signal Sout. As stated, this first control signal is representative of the position and/or the size of the encoded blocks of the multiplexes of broadcast information signals (=MBSFN channels) in the MBSFN subframes. This first control signal is fed to the extracting unit 1114 which utilizes this first control signal in order to extract the encoded blocks of data of a multiplex from the broadcast transmission signal Sout, and to provide it to the decoding unit 1106.

If the LTE frame contains only MBSFN subframes (exemplified embodiment 4 and 4A) and therefore no SIBx information (no second control signal) exists/can be received, the IND detection unit 1104 is switched off. The BIM DETECT unit 1112 now derives the PBIMCH information (the first control signal BIM), which can be located at the standardized position in the MBSFN subframe, from the transmission signal Sout. This PBIMCH information is fed as a first control signal to the extracting unit 1114 which—as already indicated above—utilizes this information in order to extract the encoded blocks of data of a multiplex of one or a plurality of broadcast information signals from the broadcast transmission signal Sout and to feed same to the decoding unit 1106.

If desired a plurality of broadcast information signals can also be received in the receiver and output to the output 1108.

As already mentioned previously, the encoded blocks of data of the multiplexes which are stored in a media broadcast subframe are each separately accessible. The receiver is now configured to separately access one of the encoded blocks of data which are stored in the media broadcast subframe, and to derive this block of data from the media broadcast subframe.

In addition, it should also be noted at this juncture that the invention relates not only to the exemplified embodiments illustrated and discussed in this case. The scope of protection of the invention is defined only by the claims. Encoded blocks of more than two multiplexes of one or a plurality of broadcast information signals can thus be incorporated in a subframe. All of the described functionalities of the transmitter and the receiver can be implemented in hardware or in software.

The invention claimed is:

1. A system comprising:
   an orthogonal frequency-division multiplexing (OFDM)-based transmitter for transmitting a first multiplex and a second multiplex of at least one broadcast information signal in a broadcast transmission mode via a transmission medium, the transmitter further comprising:
   an input for receiving the first multiplex of at least one broadcast information signal and the second multiplex of at least one broadcast information signal;
   an encoding unit further comprising:
     a first sub-encoding unit for encoding a block of data of the first multiplex of at least one broadcast information signal and for generating a first encoded block of data; and
     a second sub-encoding unit for encoding a block of data of the second multiplex of at least one broadcast information signal and for generating a second encoded block of data;
   a multiplexer unit for incorporating the first encoded block of data and the second encoded block of data into a media broadcast subframe of a single broadcast transmission signal, wherein the encoded blocks of data of the first multiplex of at least one broadcast transmission signal and the second multiplex of at least one broadcast information signal are separately accessible and separately derivable;

a control signal generator unit for generating a first control signal Broadcast Information Message (BIM) incorporated in the single broadcast transmission signal, the first control signal BIM comprises a plurality of partial control signals wherein each of the plurality partial control signals refer to a position of one of the encoded blocks of data of the first multiplex and the second multiplex; and an orthogonal frequency-division multiplexing (OFDM)-based receiver for receiving the single broadcast transmission signal in a broadcast reception mode, wherein the OFDM-based receiver contains:

an input for receiving the single broadcast transmission signal;

a demultiplexer unit for extracting the encoded block of data of the first multiplex and the encoded block of data of the second multiplex from the single broadcast transmission signal;

a decoding unit for decoding the encoded blocks of data for obtaining a block of data of the first multiplex of the at least one broadcast information signal, and for obtaining a block of data of the second multiplex of the at least one broadcast information signal; and an output for outputting at least one broadcast information signal from the first multiplex, wherein the media broadcast subframe contains an encoded block of data of a second multiplex of at least one broadcast information signals, the demultiplexer unit being further configured to extract the encoded block of data of the second multiplex of the broadcast transmission signal, and the decoding unit being further configured to decode the encoded block of data of the second multiplex in a decoded block of data of the second multiplex.

2. The system of claim 1, wherein the encoded blocks of data of the first multiplex of at least one broadcast transmission signal and the second multiplex of at least one broadcast information signal are each separately decodable.

3. The system of claim 1, wherein the media broadcast subframe is one of:
a multicast-broadcast single-frequency network (MBSFN) subframe; and
an evolved multimedia broadcast and multicast service (eMBMS) subframe.

4. The system of claim 1, wherein a first partial control signal BIM corresponds with a measure of the size of the encoded blocks of data of the first multiplex of at least one broadcast transmission signal and a second partial control signal BIM corresponds with a measure of the size of the encoded blocks of data of the second multiplex of at least one broadcast information signal.

5. The system of claim 4, wherein the OFDM-based transmitter is further configured for transmitting frames which contain the media broadcast subframes, and wherein the multiplexer unit is configured to store the first control signal in the frames.

6. The system of claim 5, wherein the OFDM-based transmitter is configured to store the first control signal in a first media broadcast subframe of a frame comprising one of:
a multicast-broadcast single-frequency network (MBSFN) subframe; or
an evolved multimedia broadcast and multicast service (eMBMS) subframe.

7. The system of claim 5 further comprising:
a spectrally adjacent non-transitory resource block, the multiplexer unit is configured to store the first control signal in the spectrally adjacent non-transitory resource block around a central frequency of a transmission channel.

8. The system of claim 5, wherein the control signal generator unit is configured to generate a second control signal, wherein the second control signal is a measure of the position of the first control signal in the frames, and the multiplexer unit is additionally configured to store the second control signal in the frames.

9. The system of claim 8, wherein the second control signal is a measure of the position of the media broadcast subframe in the frames, in which the first control signal is stored.

10. The system of claim 8 further comprising:
a non-transitory System Information Block Message wherein the multiplexer unit is configured to store the second control signal in the non-transitory System Information Block Message.

11. A receiver comprising:
an orthogonal frequency-division multiplexing (OFDM)-based receiver for receiving a broadcast transmission signal in a broadcast reception mode, wherein the broadcast transmission signal contains media broadcast subframes, and the media broadcast subframes contain an encoded block of data which is generated by encoding a block of data of a first multiplex of at least one broadcast information signal wherein the OFDM-based receiver contains:

an input for receiving the broadcast transmission signal;

a demultiplexer unit for extracting the encoded block of data of the first multiplex from the broadcast transmission signal, wherein the demultiplexer unit is configured to extract an encoded block of data of a multiplex from a non-integer number of resource blocks of the media broadcast subframe;

a decoding unit for decoding the encoded block of data for obtaining a block of data of the first multiplex of the at least one broadcast information signal, and an output for outputting at least one broadcast information signal from the first multiplex, wherein the media broadcast subframe contains an encoded block of data of a second multiplex of at least one broadcast information signals, the demultiplexer unit being further configured to extract the encoded block of data of the second multiplex of the broadcast transmission signal, and the decoding unit being further configured to decode the encoded block of data of the second multiplex in a decoded block of data of the second multiplex and wherein the encoded block of data of the first multiplex of at least one broadcast transmission signal and the second multiplex of at least one broadcast information signal are separately accessible and separately derivable.

12. The receiver of claim 11 wherein the OFDM-based receiver is compatible with at least one of:
a long-term evolution (LTE) standard specification; and
an xgeneration (xG) standard, wherein x is an integer greater than or equal to 4.

13. The receiver of claim 12, wherein the encoded blocks of data of the multiplexes which are stored in a media broadcast subframe are each separately accessible, and the receiver is configured to separately access one of the encoded blocks of data which are stored in the media broadcast subframe, and to derive this block of data from the media broadcast subframe.

\* \* \* \* \*